United States Patent [19]

Rabe et al.

[11] Patent Number: 5,764,730
[45] Date of Patent: Jun. 9, 1998

[54] RADIOTELEPHONE HAVING A PLURALITY OF SUBSCRIBER IDENTITIES AND METHOD FOR OPERATING THE SAME

[75] Inventors: Duane C. Rabe, Hawthorn Woods; Gary A. Jorgensen, Palatine; David C. Schuster, Buffalo Grove, all of Ill.

[73] Assignee: Motorola, Schaumburg, Ill.

[21] Appl. No.: 319,351

[22] Filed: Oct. 5, 1994

[51] Int. Cl.⁶ .................................................. H04Q 7/38
[52] U.S. Cl. .......................... 379/58; 379/59; 455/33.1
[58] Field of Search ............................. 379/59, 60, 61, 379/210–211; 455/33.1, 54.1

[56] References Cited

U.S. PATENT DOCUMENTS

| | | |
|---|---|---|
| 4,658,096 | 4/1987 | West, Jr. et al. |
| 4,677,653 | 6/1987 | Weiner et al. |
| 4,737,975 | 4/1988 | Shafer. |
| 4,775,997 | 10/1988 | West, Jr. et al. |
| 4,890,315 | 12/1989 | Bendixen et al. ............ 379/59 |
| 4,959,851 | 9/1990 | Tobolski, Jr. et al. |
| 5,003,629 | 3/1991 | Ness-Cohn et al. ............ 455/33.1 |
| 5,020,091 | 5/1991 | Krolopp et al. ............ 379/58 |
| 5,029,233 | 7/1991 | Metroka. |
| 5,117,450 | 5/1992 | Joglekar et al. |
| 5,371,781 | 12/1994 | Ardon ............ 379/59 |
| 5,437,053 | 7/1995 | Sawa et al. ............ 455/33.1 |

FOREIGN PATENT DOCUMENTS

| | | |
|---|---|---|
| 0526981A2 | 2/1993 | European Pat. Off. |
| 0650307A2 | 4/1995 | European Pat. Off. |
| 1366372 | 9/1974 | United Kingdom. |
| WO9507009A | 3/1995 | WIPO. |

OTHER PUBLICATIONS

IEEE article, "GSM Protocol Architecture: Radio Sub-System Signalling", Pautet et al., Jul. 1991, pp. 326–332.

*Primary Examiner*—Dwayne D. Bost
*Attorney, Agent, or Firm*—Kevin D. Kaschke; Rolland R. Hackbart

[57] ABSTRACT

A radiotelephone (303) comprises a plurality of subscriber identities (306–308) operative in a radiotelephone system (300) at the same time. The radiotelephone network (301) processes incoming and outgoing calls for the radiotelephone (303) using any one of the subscriber identities (306–308). A standard telephone interface (401) optionally provides communications between the radiotelephone (303) and one or more standard telephone sets (413–415) using any one of the subscriber identities (306–308). A method for operating the radiotelephone (303) is also disclosed.

30 Claims, 7 Drawing Sheets

RADIOTELEPHONE HAVING A PLURALITY OF SUBSCRIBER IDENTITIES AND METHOD FOR OPERATING THE SAME

FIELD OF THE INVENTION

The present invention relates generally to radiotelephones and, more particularly, to a radiotelephone having a plurality of subscriber identities and method for operating the same.

BACKGROUND OF THE INVENTION

Conventional telephone networks typically require transmission lines or cables from a telephone company central office to individual fixed locations, such as a home or an office. A conventional telephone network is otherwise known as a public switch telephone network (PSTN). Telephone lines from the conventional telephone network entering the fixed location are connected to one or more individual standard telephone sets, of a touch-tone or pulse dialing variety, or to a switching unit that may be coupled to a Private Business Exchange (PBX) or other type of internal office system network. Conventional telephone networks suffer from the disadvantage of having to lay costly transmission lines, particularly in areas outside the largest population centers. Furthermore, the individual standard telephone sets are physically wired to the telephone lines severely limiting their mobility.

Another type of telephone system is a cordless radiotelephone system. The cordless radiotelephone system provides for local communication between one or more radiotelephone subscriber units and a base station. The base station is coupled to the conventional telephone lines. The cordless radiotelephone system typically provides radiotelephone service proximate to the base station. Conventional cordless radiotelephone systems provide a coverage area from several feet up to one mile. Although cordless radiotelephone systems extend the limited mobility of the standard telephone set, the radiotelephone subscriber unit is limited to the range of the local base station and the base station remains dependent on the conventional telephone network.

Another type of telephone system is a cellular radiotelephone system. The cellular radiotelephone system provides for wide area communication between a plurality of radiotelephone subscriber units and a radiotelephone network. The radiotelephone network includes a plurality of base stations coupled to a central switching center that typically interfaces with the conventional telephone network system. Each radiotelephone subscriber includes a transmitter and a receiver, with an associated controller, that provides a radio frequency link with one or more of the base stations. The cellular radiotelephone system overcomes the problems associated with the cost and installation of the telephone lines in the conventional telephone system since communication is wireless. Further, the cellular radiotelephone system overcomes the problems associated with the local coverage area and the dependency on the conventional telephone network of cordless radiotelephone system. However, the cellular radiotelephone system suffers from a disadvantage that each radiotelephone subscriber unit has only one subscriber identity for operating in the radiotelephone network.

FIG. 1 illustrates a plurality of radiotelephone systems 100 in accordance with the prior art. A first radiotelephone system 101 (system A) includes a radiotelephone network 103 for system A and radiotelephone subscriber units 105 and 107. Radiotelephone subscriber unit 105 includes a subscriber identity 109 associated with system A. The subscriber radiotelephone unit 107 includes a subscriber identity 111 for system A and also a subscriber identity 113 for system B. Each of the subscriber units 105 and 107 can communicate with the radiotelephone network 103 for system A. A second radiotelephone system 100 (system B) includes a radiotelephone network 115 for system B and radiotelephone subscriber units 116 and 107. The radiotelephone subscriber unit 116 includes a subscriber identity for system B. The subscriber radiotelephone unit 107 includes the subscriber identity 111 for system A and also the subscriber identity 113 for system B. Both radiotelephone subscriber 116 and 117 can communicate with the radiotelephone network for system B. Each one of the first radiotelephone network 103 for system A and the radiotelephone network 115 for system B are coupled to a PSTN 117. A radiotelephone subscriber unit can communicate with another radiotelephone subscriber unit or the PSTN 117 via one of the radiotelephone networks 103 and 115. Although the radiotelephone subscriber unit 107 includes the subscriber identity 111 for system A and the subscriber identity 113 for system B, the radiotelephone subscriber 107 can only communicate with one of the radiotelephone networks 103 and 115 at a time. Only one of the subscriber identity 111 for system A and the subscriber identity 113 for system B is active in the radiotelephone subscriber unit 107 at a time. Therefore, the user of the radiotelephone subscriber unit 107 can make an outgoing call or receive an incoming call using only one of the two subscriber identities 111 and 113.

FIG. 2 illustrates a radiotelephone system 200 including a standard telephone interface 203 for a standard telephone set 204 in accordance with the prior art. The radiotelephone system 200 generally includes a radiotelephone network 206, a radiotelephone transceiver 201, the standard telephone interface 203 and the standard telephone set 204. The standard telephone interface 203 interfaces the standard telephone set 204 with the radio transceiver 201. The radiotelephone transceiver 201 may be a conventional cellular type transceiver or other transceiver having typical control inputs and outputs similar to that provided by cellular transceivers. The standard telephone interface 203 converts tone-dial or pulse-dial inputs from the standard telephone set 204 into a serial data stream for storage in the transceiver 201. The standard telephone interface 203 automatically determines when the last number or digit is dialed by the standard telephone set 204 and provides a send signal to the transceiver 201 when such determination is made. The standard telephone interface 203 responds to incoming call signals, such as alert signals from the transceiver 201 and rings the standard telephone set 204 accordingly. The standard telephone interface 203 simulates ring and dial-tone type signals under conditions typical of standard telephone set usage. Although this radiotelephone system 200 provides radiotelephone service to a standard telephone set 204, only one subscriber identity is associated with the radiotelephone transceiver 201. If additional subscriber identities are needed in the radiotelephone system 200 to provide radiotelephone service to additional standard telephone sets, additional radiotelephone transceivers are needed with each transceiver having its own subscriber identity. Increasing the number of radiotelephone transceivers with respect to the number of subscriber identities is costly. Further, when the radiotelephone transceiver 201 is portable and decoupled from the standard telephone interface 203 the standard telephone set 204 can no longer communicate with the radiotelephone network 206.

Accordingly, there is a need for a radiotelephone having a plurality of subscriber identities and method for operating

3 the same that overcomes the disadvantages of a radiotelephone subscriber unit having only one active subscriber identity at a time.

DETAILED DESCRIPTION OF THE PREFERRED EMBODIMENTS

Figure 1:
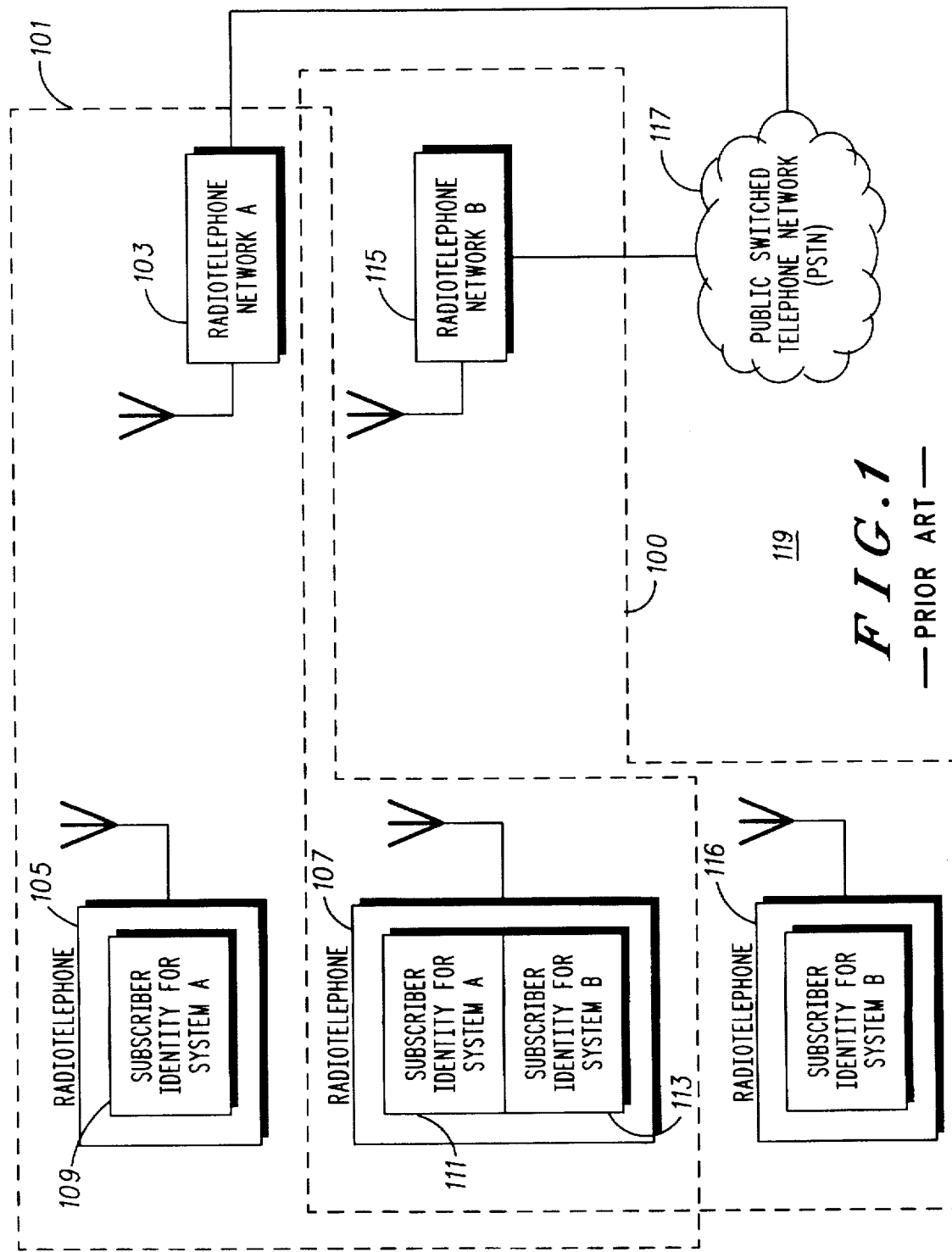
FIG. 1 illustrates a plurality of radiotelephone systems in accordance with the prior art.
Figure 2:
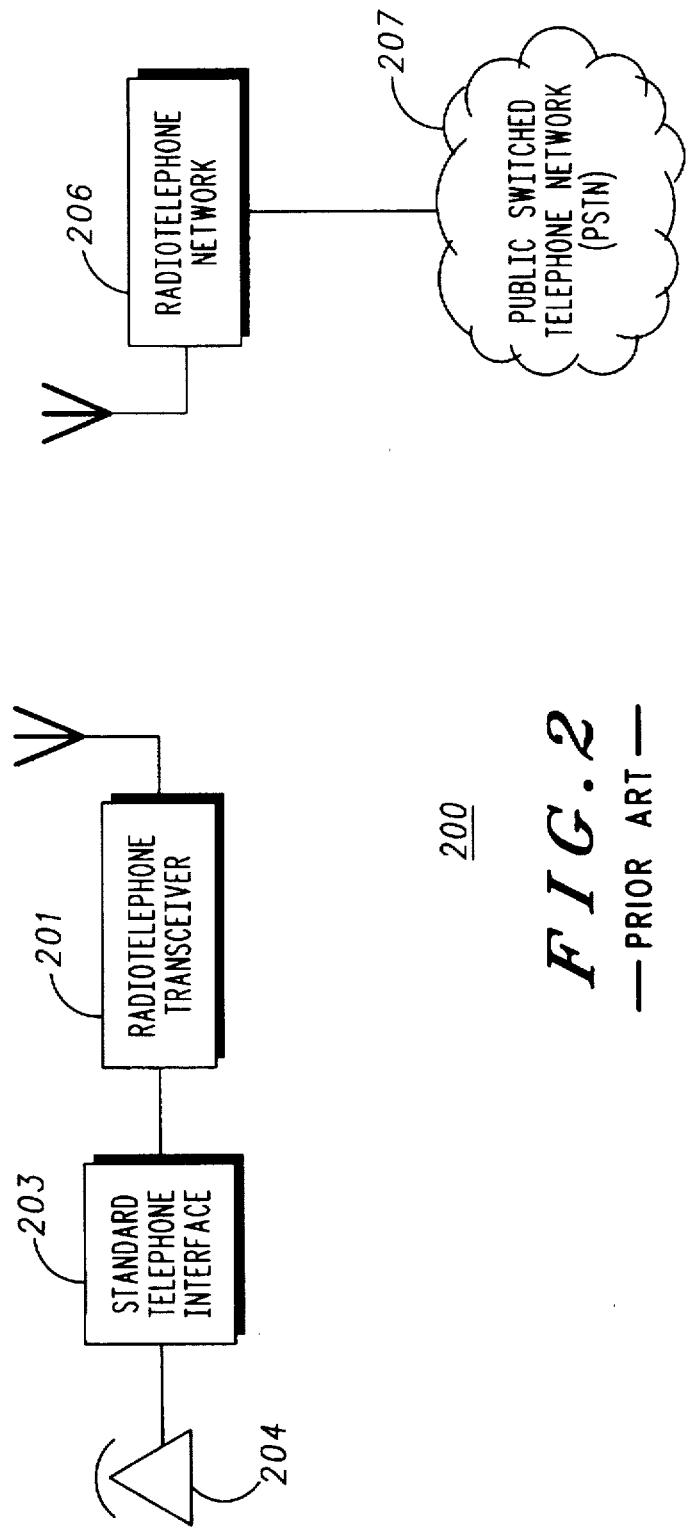
FIG. 2 illustrates a radiotelephone system including a standard telephone interface for a standard telephone set in accordance with the prior art.
Figure 3:
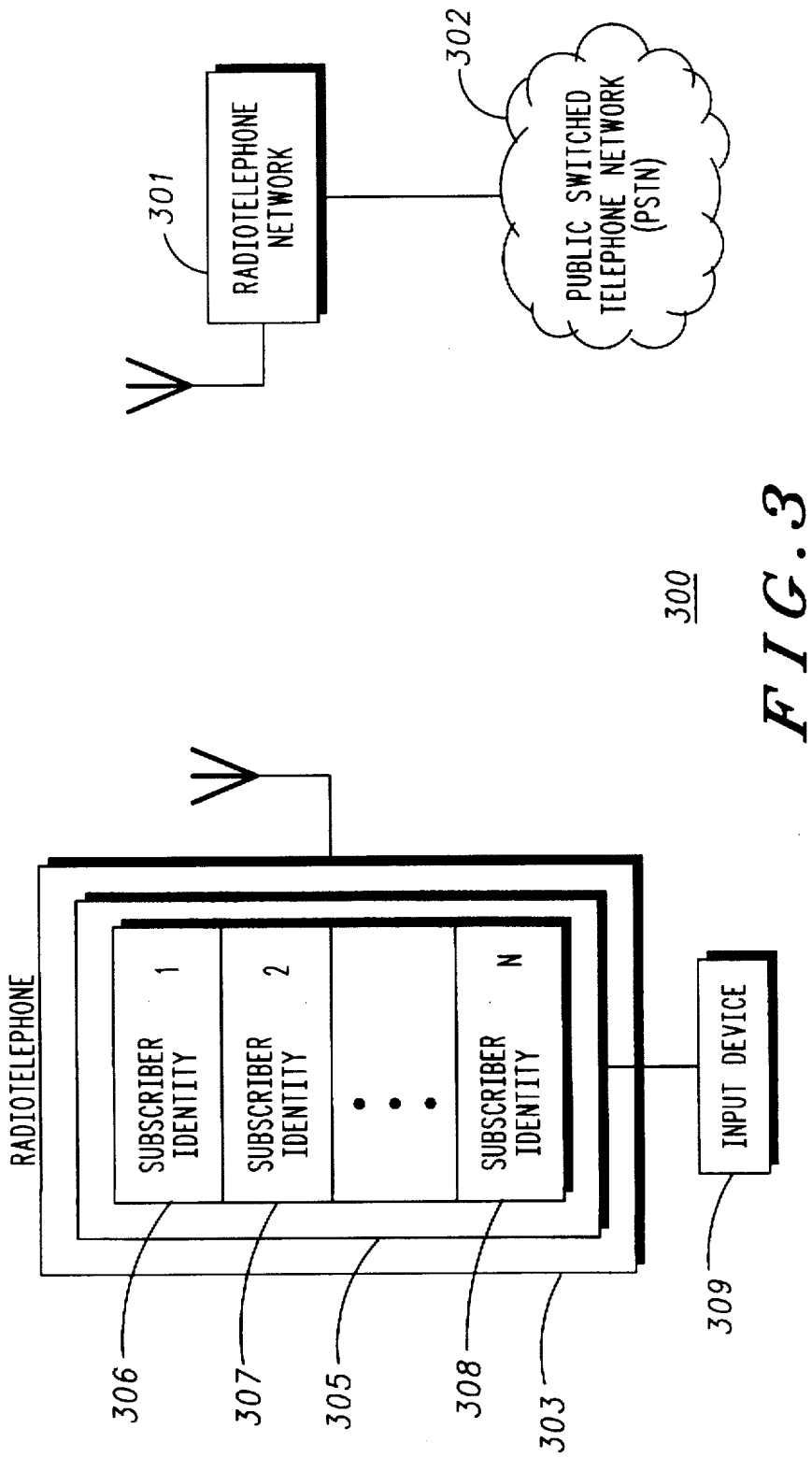
FIG. 3 illustrates a radiotelephone system in accordance with the present invention.

FIG. 3 illustrates a radiotelephone system 300 in accordance with the present invention. The radiotelephone system 300 generally includes a radiotelephone network 301 and at least one radiotelephone 303 coupled to an input device 309. The radiotelephone 303 generally includes a memory unit 305, including a plurality of subscriber identities 306, 307 and 308. The radiotelephone network 301 is coupled to a public-switched telephone network (PSTN) 302.

In accordance with the present invention, the radiotelephone 303 comprises a plurality of subscriber identities 306-308 operative in the radiotelephone system 300 at the same time. In the preferred embodiment of the present invention, the radiotelephone 303 is a fixed unit. Alternatively, the radiotelephone 303 may also be a portable unit, a mobile unit or a transportable unit.

The radiotelephone system 300 may be a digital or analog system. The radiotelephone system 300 may provide wide area coverage or local area coverage. In the preferred embodiment, radiotelephone system 300 is a digital cellular radiotelephone system operating in accordance with the Group Special Mobile (GSM) standard. The GSM standard for the radiotelephone system 300 and the radiotelephone 303 are well known in the art and described in GSM Technical Specifications, herein incorporated by reference. Other digital systems, well known in the art, that may use the present invention include the North American Digital Cellular (NADC), Code Division Multiple Access (CDMA), or Personal Digital Cellular (PDC). Alternatively, the radiotelephone system 300 may be implemented as an analog radiotelephone system, such as the Advance Mobile Phone System (AMPS), the Extended Total Area Communication System (ETACS), Nordic Mobile Phone System (NMPS), Narrow-band Advance Mobile Phone Service (NAMPS), or Japan Total Area Communication System (JTACS), each well known in the art. The radiotelephone system 300 may also be constructed in accordance with a derivative system of any of the analog or digital systems described hereinabove. The radiotelephone system 300 of the present invention is not limited to a cellular radiotelephone system, and may generally include any radiotelephone communication system apparent to one of ordinary skill in the art.

4

The subscriber identities 306-308 generally identify telephone subscribers within the radiotelephone system 300. In the preferred embodiment, the subscriber identities 306-308 are associated with corresponding phone numbers recognized by the radiotelephone network 301. The various systems described hereinabove representing the radiotelephone system 300 have different names for the subscriber identities 306-308. For example, in the GSM system a subscriber identity is known as an international mobile subscriber identity (IMSI). In the AMPS system the subscriber identity is known as an electronic serial number (ESN) which includes a phone number. The subscriber identities 306-308 may be alphanumeric, numeric, binary or the like. The subscriber identities 306-308 may be assigned to a user by either a manufacturer or a system service provider.

Generally, the plurality of subscriber identities 306-308 are operative in a radiotelephone system 300 at the same time. In the preferred embodiment, the plurality of subscriber identities 306-308 are concurrently registered in the radiotelephone network 301. The radiotelephone system 300 provides radiotelephone service for each of the subscriber identities 306-308. The radiotelephone 303 can receive an incoming call or place an outgoing call using one of the plurality of subscriber identities 306-308.

In the preferred embodiment of the present invention, only one of the plurality of subscriber identities 306-308 is used by the radiotelephone 303 in the radiotelephone system 300 at any given time. Alternatively, multiple subscriber identities 306-308 may be used by the radiotelephone 303 in the radiotelephone system 300 at the same time. Further, the multiple subscriber identities 306-308 associated with the radiotelephone 303 may be operative in the same radiotelephone system or in different radiotelephone systems (system A and B, for example). Potential applications for having the plurality of subscriber identities 306-308 associated with the radiotelephone 303 operative in the radiotelephone system 300 at the same time are numerous.

Several of these applications are described hereinbelow. Those skilled in the art will readily recognize the concepts of the present invention described herein and apply them to other applications beyond those explicitly described.

The subscriber identities 306-308 are stored in a memory unit 305. The memory unit 305 may be volatile or nonvolatile. Volatile memory includes random access memory (RAM). According to the preferred embodiment, the memory unit 305 is a RAM. Nonvolatile memory may include electrically erasable programmable read only memory (EEPROM), a Flash erasable programmable read only memory (Flash-EPROM) and a read only memory (ROM).

According to the preferred embodiment, an input device 309 receives at least one of the plurality of subscriber identities 306-308 from outside the radiotelephone 303 for transferring to the memory unit 305. The rationale behind the data input device 309 is that the plurality of subscriber identities 306-308 do not have to be fixed with the radiotelephone 303. The data input device 309 provides a means for adding additional subscriber identities to the memory unit 305 of the radiotelephone 303. The transfer of a subscriber identity to the memory unit 305 can be either permanent or temporary. Temporary transfer of a subscriber identity between radiotelephones is described in U.S. Pat. No. 5,029,233 assigned to the assignee of the present invention and herein incorporated by reference. In the preferred embodiment, the input device 309 is a card reader for accepting a card having a subscriber identity. The transfer of the subscriber identity is temporary in the sense that it is resident in the memory unit 305 until the card is removed from the card reader, then it is erased. Alternatively, the input device 309 may be a cradle for accepting a portable radiotelephone having a subscriber identity. Moreover, the input device 309 may be any other type of user interface such as a keypad, a voice recognition unit, or the like. The data input device 309 will be described in further detail with reference to FIG. 4.

Figure 4:
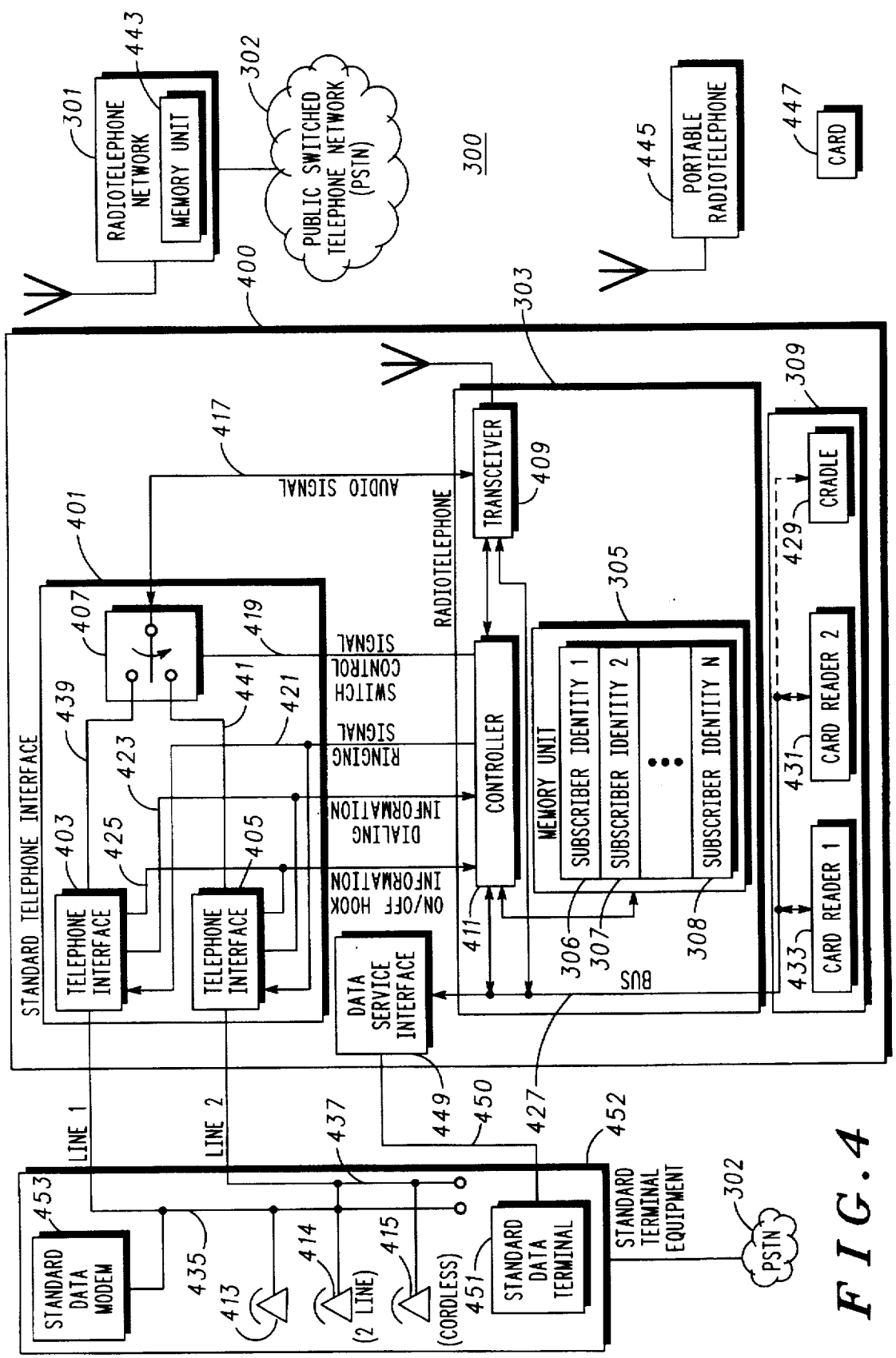
FIG. 4 illustrates a radiotelephone system comprising a subscriber telephone system and a radiotelephone network in accordance with the present invention.

FIG. 4 illustrates the radiotelephone system 300 comprising the radiotelephone network 301 and a subscriber telephone system 400. The radiotelephone network 301 generally includes a memory unit 443. FIG. 4 generally incorporates the radiotelephone system 300 of FIG. 3 and adapts the radiotelephone 303 to a particular application advantageously utilizing the plurality of subscriber identities 306–308. Other applications for the novel radiotelephone 303 will be apparent to those skilled in the art.

The subscriber telephone system 400 generally includes a standard telephone interface 401, the radiotelephone 303, the data input device 309, and a data service interface 449. The standard telephone interface 401 generally includes two telephone interfaces 403 and 405 and a switch 407. The radiotelephone 303 generally includes the memory unit 305, one or more input devices 309, a transceiver 409 and a controller 411. The input device 309 includes a plurality of card readers 433 and 431. Alternatively, the input device may comprise a cradle 429 in place of or in addition to the card readers 431 and 433. Communication among the transceiver 409, the controller 411, the data input device 309 and data service interface 449 occurs over the radiotelephone interface bus 427.

The subscriber telephone system 400 generally supports several types of standard terminal equipment 452, including standard telephone sets 413–415, a standard data modem 453, and a standard data terminal 451, which may be an Integrated Digital Services Network (ISDN) terminal, for example.

The general operation of the radiotelephone 303 is well known in the art. Such general operation includes using the controller 411 to manage radiotelephone resources including any input/output interface, transceiver operation, network communication, and memory management. The technical standards for GSM, NADC, and AMPS each describe the general operation of radiotelephones and are herein incorporated by reference.

The subscriber telephone system 400 communicates with the radiotelephone network 301 to provide standard telephone service for a user. As described in FIG. 3, the radiotelephone 303 has multiple subscriber identities 306–308 operative in the radiotelephone network 301 at the same time. The standard telephone interface 401 provides communications between the radiotelephone 303 and at least one of the standard telephone set 413–415 and/or the standard data modem 453.

Communication between the radiotelephone 303 and the standard telephone interface 401 is provided by lines 417, 419, 421, 423, and 425. Line 417 has audio signals. Line 419 has a switch control signal. Line 421 has a ringing signal. Line 423 has dialing information. Line 425 has on / off hook information Line 417 is coupled between the transceiver 409 and the switch 407. Line 419 is coupled between the controller 411 and the switch 407. Lines 421, 423, and 425 are coupled between the controller 411 and telephone interfaces 403 and 405. Lines 417, 421, 423, and 425 are described in U.S. Pat. No. 5,117,450 and U.S. Pat. No. 4,959,851, each herein incorporated by reference.

The data input device 309 receives at least one subscriber identity for transfer to the memory unit 305 of the radiotelephone 303. In the preferred embodiment, the data interface 309 includes the card readers 433 and 431 as is well known in the art. Each card reader 433 and 431 can accept a card 447 having one of the plurality of subscriber identities 306–308. In the preferred embodiment, the card 447 is a subscriber identity module (SIM) card, as is used in the GSM system mentioned hereinabove.

Alternatively, the data input device 309 may be the cradle 429 for accepting a portable radiotelephone 445 having one of the plurality of subscriber identities. When the portable telephone 445 is placed in the cradle 429 the subscriber identity in the portable telephone 445 is electronically transferred from the portable radiotelephone 445 to the memory unit 305 of the radiotelephone 303. When the portable radiotelephone 445 is removed from the cradle 429 the subscriber identity originally associated with the portable radiotelephone 445 is removed from the memory unit 305 of the radiotelephone 305 and is again associated with the portable radiotelephone telephone 445. U.S. Pat. No. 5,029,233, herein incorporated by reference, describes an apparatus and method for electronically transferring a subscriber identity between radiotelephones.

Alternatively, the portable telephone 445 may comprise more than one subscriber identity. In this case, the portable telephone 445 replaces the radiotelephone 303 and provides all the functions of the radiotelephone 303 for the subscriber telephone system 400 in accordance with the present invention.

The rationale behind the data input device 309 is that a particular subscriber identity is not fixed with the radiotelephone 303 for all time. A user may want at least one of the subscriber identities to be portable. In essence, a subscriber identity is associated with the user anywhere within the radiotelephone system 300. The subscriber identity is not necessarily tied to any particular radiotelephone hardware, but may be readily transferred to any radiotelephone hardware. This allows the radiotelephone network 301 to route calls to the subscriber independent of the radiotelephone hardware that he is using. This portability can be accomplished using the card 447, the portable telephone 445 or any other means incorporating a memory unit for storing the subscriber identity. By providing for multiple subscriber identities (for example, phone numbers) to be associated with the subscriber radiotelephone system 400, one subscriber identity may be removed while still providing radiotelephone service to the standard telephone equipment 452. The benefit of this is illustrated by the following example.

If a fixed subscriber radiotelephone system 400, containing two subscriber identities 306 and 307, is placed in the subscriber's home, the user may temporarily remove the first identity 306 for use in a conventional portable radiotelephone 445 while the user is away from home. The second subscriber identity 307 remains in the fixed unit, supporting radiotelephone service for the family members who remain at home as an alternative to the conventional wired residential telephone service. This system configuration is particularly advantageous when the radiotelephone service is less expensive than the conventional wired residential telephone service. By also making the second subscriber identity removable, it is possible to take that identity with the family when it travels to another location, such as a vacation home. By example, one subscriber identity may be associate with a business and the other subscriber identity may be associated with a home. Therefore, either of the subscriber identities may remain with the fixed subscriber radiotelephone system 400 or be taken with the subscriber depending on the subscriber's particular needs at the time.

In the preferred embodiment, each standard telephone set 413–415 is selectively associated with one of the plurality of subscriber identities 403 and 405. In the preferred embodiment, the selective association is accomplished using the switch 407 controlled by the controller 411 via the control signal at line 419. While it is possible to support two or more subscriber identities with a single standard telephone set, it may be more convenient to provide two standard telephone interfaces 435 and 437 and to associate each with a specific subscriber identity 306 and 307. In this way, it is convenient, for instance, to distinguish between a business related subscriber identity and a personal subscriber identity, by associating each standard telephone set with a specific subscriber identity. Use of a standard telephone set 414 which supports two telephone lines is desirable because it is capable of conveniently selecting a specific subscriber identity, which corresponds to one of the standard telephone lines 435 and 437.

Alternatively, each one of the plurality of subscriber identities 306, 307, 308 corresponds to each one of a plurality of standard telephone sets 413, 414, and 415, respectively. By associating each subscriber identity 306–308 with a separate and distinct standard telephone set 413–415 or collection of standard telephone sets, it is possible for the user to distinguish each one of the plurality of subscriber identities operative in the radiotelephone system 300. In this case, each standard telephone set may be associated with one and only one subscriber identity, even though there may be multiple standard telephone sets associated with a single subscriber identity. Thus, one standard telephone set or group of standard telephone sets may be dedicated for personal use and associated with a personal subscriber identity (for example, a phone number). Likewise a different standard telephone set or group of standard telephone sets may be dedicated for business use and associated with a business subscriber identity (for example, a phone number).

In another embodiment, at least one standard telephone set is selectively associated with one of the plurality of subscriber identities 306–308 for the purpose of responding to an incoming call. Associating multiple subscriber identities with a single standard telephone set may result in confusion regarding which subscriber identity it is intended for. This confusion may be avoided by providing distinctive ringing sequences for each subscriber identity. An even better solution is to provide multiple standard telephone lines from multiple telephone interfaces and to associate each with a specific subscriber identity. Again, a two-line standard telephone set is useful to selectively access either line from a single standard telephone set.

In another embodiment, at least one standard telephone set 413 may be selectively associated with one of the plurality of subscriber identities responsive to an outgoing call. If only a single standard telephone set 413 is used, it is necessary to select a specific subscriber identity for use in originating an outgoing call. In this case, it is possible to manually select which subscriber identity is to be used when originating a call. Manual selection of a specific subscriber identity can be accomplished by means of a sequence of key presses on the standard telephone set. Alternatively, a predetermined selection of one subscriber identity may be used for originating the call. Another solution is to use multiple standard telephone lines and to associate each with a specific subscriber identity. Thus, one line may be associated with a subscriber identity normally used for business calls and second line may be associated with a subscriber identity normally used for personal calls. A two-line standard telephone set is useful to selectively access a specific standard telephone line, from a single standard telephone set, and therefore select a specific subscriber identity for the purpose of originating an outgoing call.

In one alternative embodiment, data traffic is communicated over the voice channel, using a standard data modem 453, such as one which implements the CCITT V.32 standard. In this embodiment the data traffic signal is routed through a path which includes the audio signal line 417, the audio switch 407, and the telephone interfaces 403 including its input line 439, and the standard telephone line 435.

In another embodiment, data traffic is not communicated over the voice channel. Rather, it is sent over a dedicated data traffic channel and is routed between the transceiver 409 and the standard data terminal 451 through a path that includes the radiotelephone interface bus 427 and the data service interface bus 450.

In one embodiment it is also possible for the subscriber radiotelephone system 400 to support multiple traffic channels (voice and data) through the radiotelephone system 300. It is possible, for instance, to concurrently support two data calls, two voice calls, or a data and a voice call. Both calls may be associated with a single subscriber identity, or each of the calls may be associated with different subscriber identities.

In another embodiment of the present invention, the multiple subscriber identities 306–308 of the radiotelephone 303 may be operative in different radiotelephone systems (system A and B, for example) at the same time. The radiotelephone 303 would be capable of communicating with either radiotelephone system at the same time or at different times. This configuration is particularly advantageous when the coverage areas of the different systems widely vary. The subscriber therefore, would increase the effective coverage area for the radiotelephone 303. Other advantages of this configuration will be apparent to those skilled in the art.

In the preferred embodiment the radiotelephone network 301 has a memory unit 443 for storing information associating the plurality of subscriber identities 306–308 with one radiotelephone 303. Using the subscriber information stored in the memory unit 443, the radiotelephone network 301 can determine if a call is in progress to any one of the multiple subscriber identities 306–308 associated with a single radiotelephone 303. With this information, the radiotelephone network 301 may determine that the subscriber radiotelephone system 400 is already occupied with a call and is not available to accept the incoming call. The radiotelephone network 301 may then take one of several possible actions. The radiotelephone network 301 manages the conflicts resulting from multiple calls to the subscriber radiotelephone system 400 according to a method described with reference to FIG. 7. While it is desirable for the radiotelephone network 301 to manage conflicts resulting from multiple calls to the subscriber radiotelephone system 400, this is not necessary. The subscriber radiotelephone system 400 is also capable of managing conflicts resulting from multiple calls according to a method described with reference to FIG. 6.

The present invention also contemplates that the multiple subscriber identities 306–308 may be assigned to different users and associated with a single subscriber radiotelephone system 400. This configuration could support telephone service to multiple residences through a single subscriber radiotelephone system 400. In this embodiment, a single telephone interface 403 may support telephone service for multiple subscribers in a manner that is well known in the PSTN as "party line service". Alternatively, multiple telephone interfaces may be used to provide telephone service known in the PSTN as "private line service", with the restriction that calls may be blocked when the radiotelephone 303 is already occupied with one or more calls.

The present invention also contemplates that the subscriber telephone system 400 could accommodate a connection to the PSTN 302 through a wired telephone subscriber loop. With appropriate control, such a connection could allow for an alternative communication path between the subscriber telephone system 400 and the PSTN 302.

Figure 5:
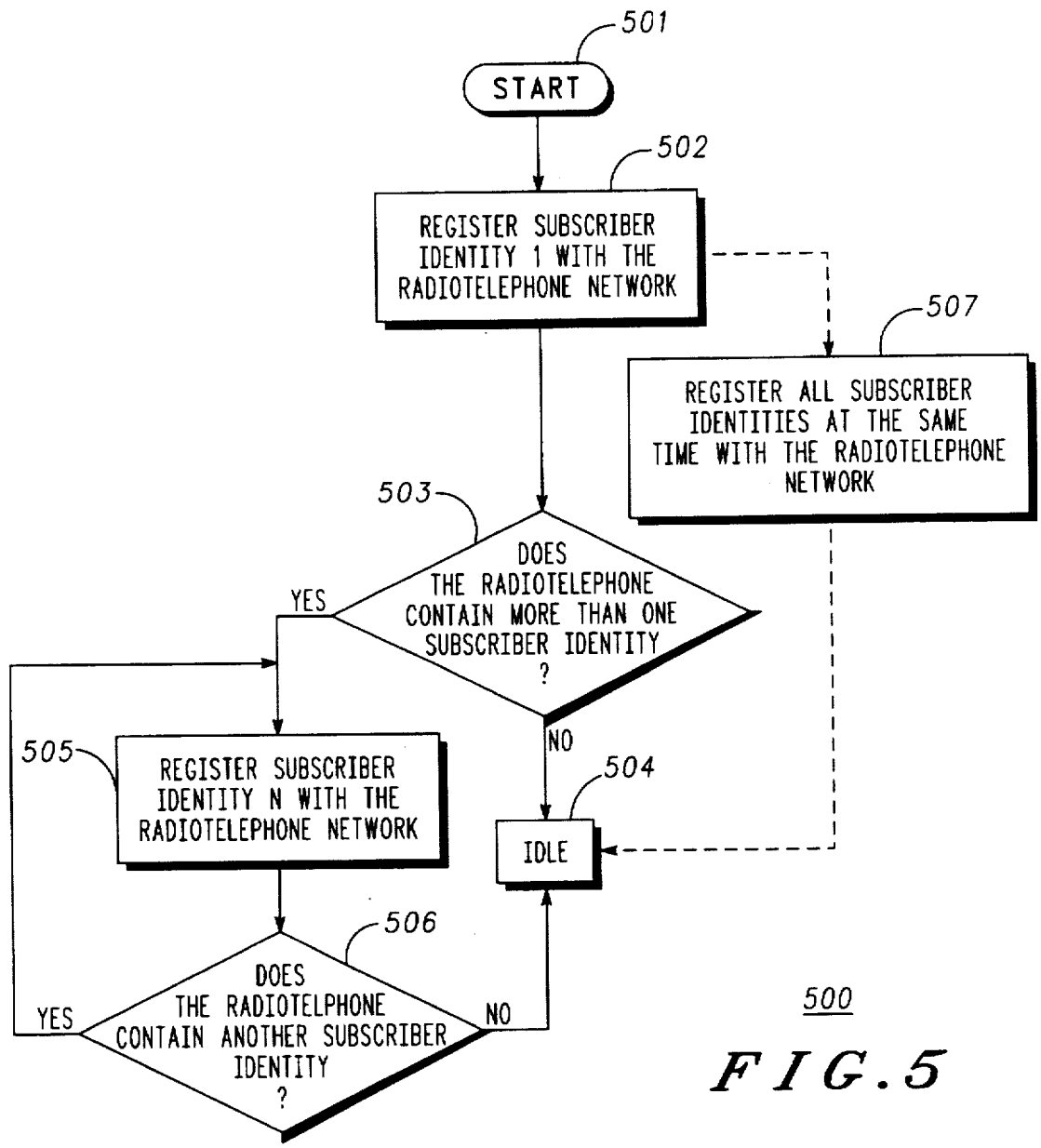
FIG. 5 illustrates a flow chart describing the operation of a radiotelephone in accordance with the present invention.

FIG. 5 illustrates a flow chart 500 describing the operation of a radiotelephone 303 in accordance with the present invention. Generally, in FIG. 5 the radiotelephone 303 registers, with the radiotelephone network 301, the plurality of subscriber identities 306–308 associated with the radiotelephone 303. Registration of the subscriber identities 306–308 can occur one at a time, as represented by steps 502–506, or at the same time, as represented by steps 507 and 504. The flow begins at step 501.

To register the subscriber identities 306–308 one at a time, at step 502 the radiotelephone 303 registers a first subscriber identity 306 with the radiotelephone network 301. At step 503, the radiotelephone 303 determines if more than one subscriber identity 306–308 is available to the radiotelephone 303. Generally, this determination is accomplished by examining the memory unit 305 inside the radiotelephone 303. If the determination is negative, at step 504 the radiotelephone 303 enters a normal idle mode. If the determination is positive, at step 505 the radiotelephone 303 registers the next subscriber identity 306–308 with the radiotelephone network 301. At step 506, the radiotelephone determines if more subscriber identities 306–308 are available. Again, this determination would generally be accomplished by examining the memory unit 305 inside the radiotelephone 303. If the determination is negative, at step 504 the radiotelephone 303 enters a normal idle mode. If the determination is positive, the flow continues with step 505.

Alternatively, to register the subscriber identities 306–308 at the same time, at step 507 the radiotelephone 303 registers all subscriber identities 306–308 with the radiotelephone network 301. At step 504 the radiotelephone 303 enters the normal idle mode.

Generally registration has two purposes. The first purpose is to determine which subscriber identities 306–308 are active in the radiotelephone system so that the radiotelephone network 301 does not have to page for inactive subscriber identities 306–308. The second purpose is to allow for automatic roaming between radiotelephone networks.

The process of registering a subscriber identity 306–308 differs from system to system. Some radiotelephone systems do not require registration at all, while some systems require reregistration of a subscriber identity only when moving from area to area. In addition, systems that require some sort of registration, such as the GSM system, may require reregistration of a subscriber identity 306–308 whenever that subscriber identity is activated, and deregistration of a subscriber identity 306–308 whenever that subscriber identity is deactivated. The system may allow the radiotelephone 303 to register more than one subscriber identity 306–308 at a time, or limit the radiotelephone 303 to registering each subscriber identity 306–308 independently. In the preferred embodiment, multiple subscriber identities 306–308 are registered one at a time in accordance with GSM Technical Specification 4.08, Mobile Radio Interface Layer 3 Specification, February 1992, sections 4.4.3 and 4.4.4 each time the subscriber identities 306–308 are activated, and whenever the subscriber identities 306–308 move from area to area. This allows a radiotelephone 303 with multiple subscriber identities 306–308 to operate in the current GSM system. Alternately, the radiotelephone 303 could perform one registration procedure in which all subscriber identities 306–308 active in that radiotelephone are registered at once, thus greatly reducing the time and effort required to register multiple subscriber identities. This could be accomplished by allowing multiple subscriber identities 306–308 to be included in the registration message sent from the radiotelephone 303 to the radiotelephone network 301.

Figure 6:
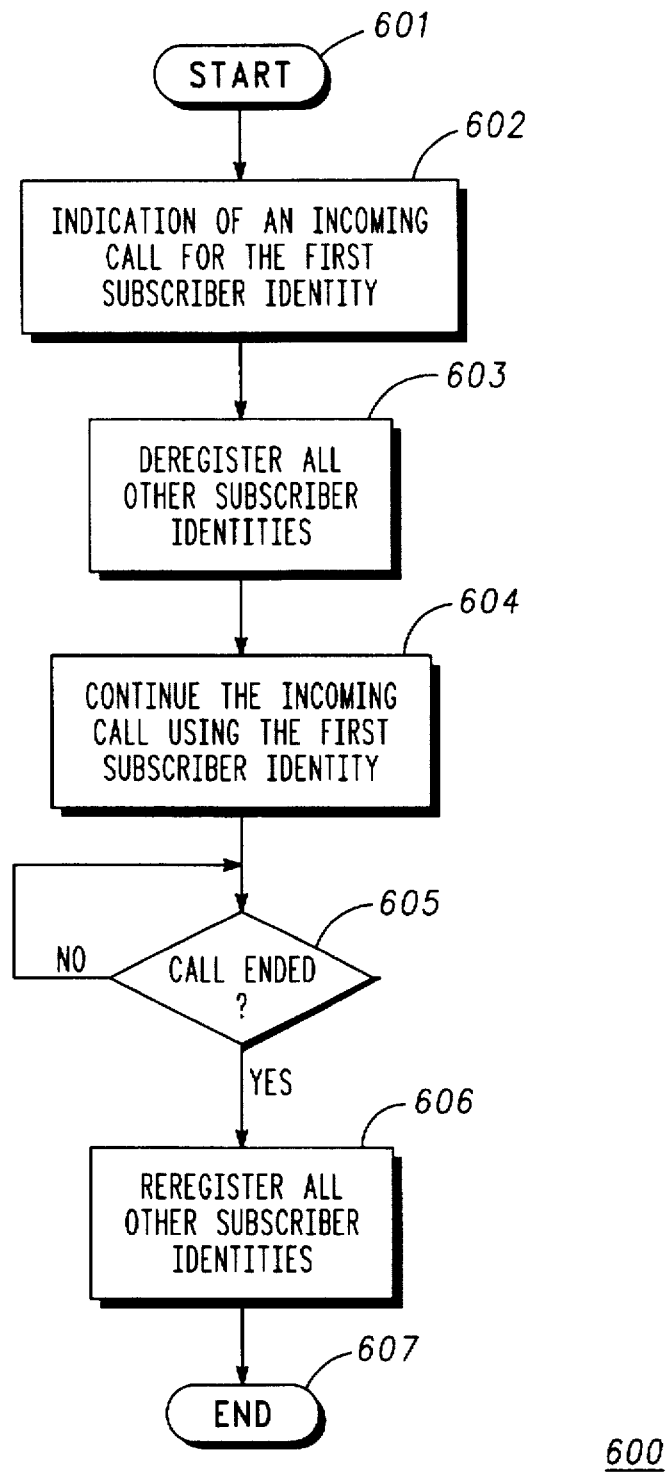
FIG. 6 illustrates a flow chart describing the operation of a radiotelephone in accordance with the present invention.

FIG. 6 illustrates a flow chart 600 describing the operation of the radiotelephone 303 in accordance with the present invention. The plurality of subscriber identities 306–308 includes first 306 and second 307 subscriber identities. The flowchart 600 generally describes how the radiotelephone 303 processes an incoming call. The flow begins at step 601.

At step 602 the radiotelephone 303 receives an indication of an incoming call for the first subscriber identity 306. An indication of an incoming call could be a signal or a message, sent by the radiotelephone network 301 to the radiotelephone 303, indicating to the radiotelephone 303 that a call connection should be initiated. In the preferred embodiment, the incoming call indication is provided by a paging message, as defined in the aforementioned GSM Technical Specification 4.08, sections 9.1.21, 9.1.22, and 9.1.23.

At step 603 the radiotelephone 303 deregisters the second subscriber identity 307 responsive to the step of receiving the indication of the incoming call. In the preferred embodiment, deregistration is accomplished by means of the IMSI Detach procedure and the IMSI Detach Indication message, as defined in the aforementioned GSM Technical Specification 4.08, sections 4.3.4 and 9.2.10, respectively.

Once the radiotelephone 303 is active in a call with a subscriber identity 306, that radiotelephone is unable to listen for pages for a second subscriber identity 307. If the radiotelephone network 301 attempts to page the second subscriber identity 307, the page will go unanswered, which may result in a long delay while the radiotelephone network 301 attempts to page the subscriber identity 307, followed by the radiotelephone network 301 returning an out-of-service indication. The radiotelephone network 301 will no longer page a subscriber identity 306–308 once that subscriber identity 306–308 is deregistered, preventing the long delay, and possibly allowing the incoming call to be forwarded to another number or to be forwarded to voice mail.

At step 604 the radiotelephone 303 continues the incoming call using the first subscriber identity 306 responsive to the step of deregistering the second subscriber identity 307. To continue the incoming call, the radiotelephone 303 and the radiotelephone network 301 simply continue whatever signaling is needed to connect the call and the voice channel.

At step 605, the radiotelephone 303 determines if the incoming call has been ended. If the determination is negative, the radiotelephone 303 waits for the incoming call to end. If the determination is positive, at step 606 the radiotelephone 303 reregisters the second subscriber identity 307 responsive to ending the incoming call. Generally, the reregistration of the deregistered subscriber identities is accomplished by the same means as the initial registration. In the preferred embodiment, the radiotelephone 303 follows the procedures for registration in accordance with the aforementioned GSM Technical Specification 4.08, sections 4.4.3 and 4.4.4. Reregistration of the second subscriber identity 307 allows that subscriber identity to again receive incoming calls.

The step of deregistering the second subscriber identity 307 may occur during set up of the incoming call. To deregister a subscriber identity 306–308 during set up of the call, the radiotelephone 303 would have to perform the deregistration procedure before a voice channel had been granted. While this is the preferred method, the radiotelephone 303 may not have enough time to perform the deregistration procedure before a voice channel is granted. This method is preferred over deregistering during a call because the latter method may disrupt the audio.

The step of deregistering the second subscriber identity 307 may alternatively occur after the incoming call has been set up. If the radiotelephone 303 does not have enough time to complete the deregistration before a voice channel is granted, or if the radiotelephone 303 is prevented by protocol from performing the deregistration during set up of the call, the deregistration procedure could be performed on the voice channel. In the GSM system, the deregistration procedure can take place at any time during a call, including call setup.

Deregistering the second subscriber identity 307 prevents the radiotelephone network 301 from paging the second subscriber identity 307. However, if no other action is taken, the calling party receives an out-of-service indication when attempting to call the second subscriber identity 307. Another solution would be to provide a subscriber-busy signal to the calling party. Different radiotelephone networks 301, depending on their implementation, and different subscriber identities 306–308, depending on their subscription, each may respond differently to a page for the second subscriber identity 307. For instance, a radiotelephone network 301 could forward the calling party to another number, forward the calling party to a voice mail service, perform call waiting, or simply give a user-busy tone to the calling party.

More than one subscriber identity 306–308 may be handled on one radiotelephone 303 by forwarding an incoming call for a first subscriber identity 306, associated with the radiotelephone 303, to a second subscriber identity 307, associated with the radiotelephone 303. The procedure which a radiotelephone 303 must follow to forward calls is dependent on the system. In the preferred embodiment, call forwarding is performed by setting up a connection between the radiotelephone 303 and the radiotelephone network 301, and transferring a message from the radiotelephone 303 to the radiotelephone network 301, indicating that all incoming calls for that subscriber identity should be forwarded, and also indicating the phone number or subscriber identity to which calls should be forwarded.

Forwarding incoming calls from one subscriber identity 306–308 to another allows the radiotelephone network 301, without knowing which subscriber identities 306–308 are registered from which radiotelephones 303, to initiate number busy procedures, such as call waiting or redirection to voice mail, if either subscriber identity 306–308 in a radiotelephone is busy with a call. For example, if all incoming calls for the first subscriber identity 306 are forwarded to the second subscriber identity 307, and both subscriber identities are active in one radiotelephone, and the second subscriber identity 307 is active in a call, calls for the first subscriber identity 306 would be forward to the second subscriber identity 307, which would result in initiation of busy signal procedures. If call fowarding was not in effect, the calling party might instead receive an off-air indication for subscriber identity 1 306. Forwarding incoming calls can also cause all incoming calls for any subscriber identity 306–308 active in a radiotelephone 303 to ring one standard telephone set.

The step of forwarding an incoming call may occur prior to establishing the incoming call or placing an outgoing call. Call forwarding of this type could be performed automatically, or manually by the user. If done automatically, the radiotelephone 303 could automatically forward incoming calls for a subscriber identity 306–308 when the subscriber identity 306–308 is registered. If done manually, the user could initiate call forwarding by manually entering the call forwarding sequence on the standard telephone set. This method allows for faster call set up times, by removing the call forwarding step from the call procedure.

The step of forwarding an incoming call may also occur during the incoming call or during an outgoing call. Generally, the radiotelephone 303 would forward incoming calls during setup of a call by automatically sending a message to the radiotelephone network 301 requesting that all incoming calls be forwarded to another, predetermined number. This method removes the user from the process by taking care of call forwarding automatically. It also allows for all subscriber identities 306–308 to remain unforwarded when no call is active on the radiotelephone 303, thus allowing billing to different subscriber identities 306–308, and allowing different handsets to ring when an incoming call is established based on which subscriber identity 306–308 is being paged.

Instead of placing the burden for forwarding calls on the radiotelephone 303, an alternate solution would be to have the radiotelephone network 301 know which subscriber identities 306–308 are associated with which radiotelephones 303, and which radiotelephones 303 are busy.

Figure 7:
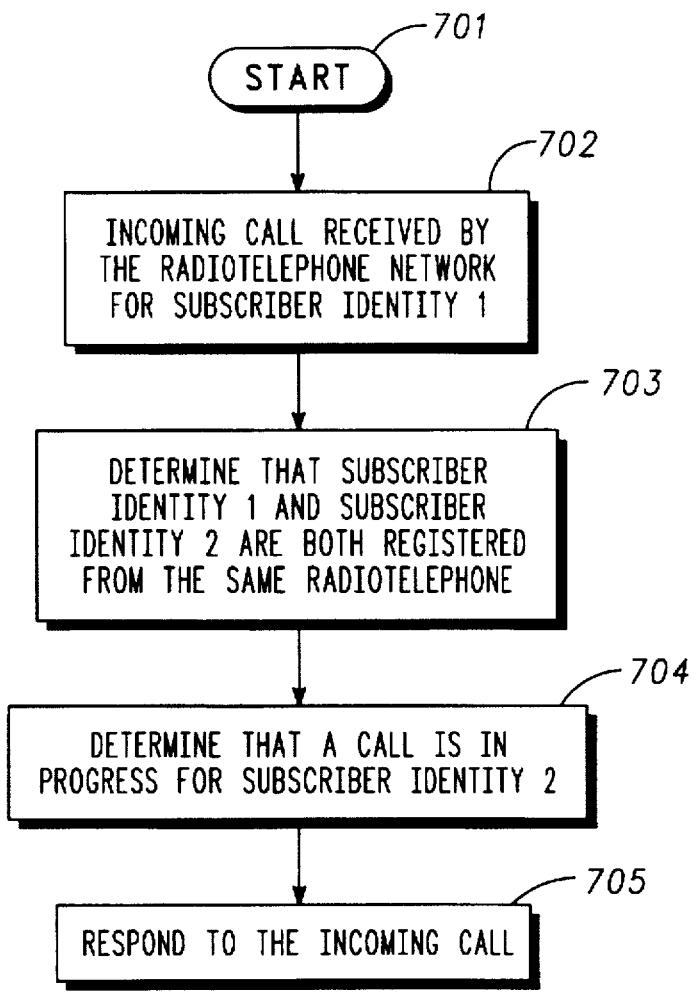
FIG. 7 illustrates a flow chart describing the operation of a radiotelephone network in accordance with the present invention.

FIG. 7 illustrates a flow chart 700 describing the operation of the radiotelephone network 301 in accordance with the present invention. The plurality of subscriber identities 306–308 includes first 306 and second 307 subscriber identities. The flowchart 700 describes how the radiotelephone network 301 processes incoming calls for more than one mobile identity 306-307 active on one radiotelephone 303. The flow begins at step 701. At step 702, the radiotelephone network 301 receives an incoming call request for a first subscriber identity 306.

At step 703, the radiotelephone network 301 determines that a second subscriber identity 307 and the first subscriber identity 306 are associated with the same radiotelephone 303. The radiotelephone network 301 determines that the subscriber identities 306 and 307 are both associated with the same radiotelephone 303 by looking in a database associating the two. The database can be compiled by various means. For example, each time a radiotelephone 303 registers a subscriber identity 306–308, the radiotelephone network 301 can request the hardware identity of the radiotelephone 303, and enter the pairing of the subscriber identities 306–308 and hardware identities in a database. In the preferred embodiment, this would be accomplished via the Identification Procedure as defined in the aforementioned GSM Technical Specification 4.08, section 4.3.3.

At step 704, the radiotelephone network 301 determines that a call is in progress for the second subscriber identity 307. At step 705, the radiotelephone network 301 responds to the incoming call request. The radiotelephone network 301 may respond with a busy signal, may route the incoming call to a voice message service, may forward the incoming call to a predetermined subscriber identity, or may send a call waiting message to the second subscriber identity 307.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. A radiotelephone comprising:
    a memory unit for storing a plurality of subscriber identities operative in a radiotelephone system at the same time;
    a transceiver for transmitting and receiving calls using one of the plurality of subscriber identities;
    a controller coupled to the memory unit and the transceiver and adapted for:
        registering the plurality of subscriber identities in a radiotelephone network of the radiotelephone system;
        detecting that a call is being transmitted or received using the one subscriber identity;
        deregistering all of the plurality of the subscriber identities except the one subscriber identity responsive to the step of detecting.

2. A radiotelephone according to claim 1 wherein the plurality of subscriber identities are concurrently registered in the radiotelephone network.

3. A radiotelephone according to claim 1 further comprising an input device for receiving at least one of the plurality of subscriber identities.

4. A radiotelephone according to claim 3 wherein the input device further comprises a card reader for accepting a card having one of the plurality of subscriber identities.

5. A subscriber telephone system for providing communications between at least one standard terminal equipment and a radiotelephone network comprising:
    at least one radiotelephone, having a plurality of subscriber identities operative in the radiotelephone network at the same time, for communicating with the radiotelephone network; and
    a standard telephone interface for providing communications between the at least one radiotelephone and the at least one standard terminal equipment,
    wherein each one of the plurality of subscriber identities corresponds to each one of a plurality of standard terminal equipment, respectively.

6. A subscriber telephone system according to claim 5 wherein the plurality of subscriber identities are concurrently registered in the radiotelephone network.

7. A subscriber telephone system according to claim 5 wherein the at least one radiotelephone further comprises a card reader for accepting a card having one of the plurality of subscriber identities.

8. A subscriber telephone system according to claim 5 further comprising a cradle for accepting a portable radiotelephone having one of the plurality of subscriber identities.

9. A subscriber telephone system according to claim 5 wherein the at least one standard terminal equipment is selectively associated with one of the plurality of subscriber identities.

10. A subscriber telephone system according to claim 9 wherein the at least one standard terminal equipment is selectively associated with one of the plurality of subscriber identities responsive to an incoming call.

11. A subscriber telephone system according to claim 9 wherein the at least one standard terminal equipment is selectively associated with one of the plurality of subscriber identities responsive to an outgoing call.

12. A subscriber telephone system for providing communications between at least one standard terminal equipment and a radiotelephone network comprising:
    at least one radiotelephone, having a plurality of subscriber identities operative in the radiotelephone network at the same time, for communicating with the radiotelephone network using one of the plurality of subscriber identities;
    a standard telephone interface for converting radiotelephone communications from the at least one radiotelephone to tip and ring communications for the at least one standard terminal equipment; and
    an input device for receiving at least one of the plurality of subscriber identities,
    wherein each one of the plurality of subscriber identities corresponds to each one of a plurality of standard terminal equipment, respectively.

13. A subscriber telephone system for providing communications between at least one standard terminal equipment and a Group Special Mobile (GSM) radiotelephone network comprising:
    at least one cellular radiotelephone subscriber unit, having a plurality of subscriber International Subscriber Mobile Identities (IMSIs) registered in the GSM radiotelephone network at the same time, for communicating with the GSM radiotelephone network using one of the plurality of subscriber IMSIs;
    a standard telephone interface for providing communications between the at least one cellular radiotelephone subscriber unit and the at least one standard terminal equipment; and
    at least one input device for receiving at least one of the plurality of subscriber IMSIs,
    wherein each one of the plurality of subscriber identities corresponds to each one of a plurality of standard terminal equipment, respectively.

14. A radiotelephone system comprising:
    at least one radiotelephone having a plurality of subscriber identities; and
    a radiotelephone network including:
        a memory unit for storing information associating the plurality of subscriber identities with the at least one radiotelephone;
        a transceiver for transmitting and receiving calls using one of the plurality of subscriber identities; and
        a controller coupled to the memory unit and the transceiver and adapted for:
            registering the plurality of subscriber identities in a radiotelephone network of the radiotelephone system;
            detecting that a call is being transmitted or received using the one subscriber identity;
            deregistering all of the plurality of the subscriber identities except the one subscriber identity responsive to the step of detecting.

15. A radiotelephone system according to claim 14 wherein the plurality of subscriber identities are concurrently registered in the radiotelephone network.

16. A radiotelephone system according to claim 14 wherein the radiotelephone network is coupled to a public switched telephone network.

17. A radiotelephone system according to claim 14 further comprising a subscriber telephone system comprising:
the at least one radiotelephone; and
a standard telephone interface for providing communications between the at least one radiotelephone and at least one standard terminal equipment.

18. A radiotelephone system comprising:
at least one radiotelephone having a plurality of subscriber identities; and
a radiotelephone network including:
a memory unit for storing information linking the plurality of subscriber identities with the at least one radiotelephone, wherein a call between the at least one radiotelephone and the radiotelephone network is processed using one of the plurality of subscriber identities;
a transceiver for transmitting and receiving calls using one of the plurality of subscriber identities; and
a controller coupled to the memory unit and the transceiver and adapted for:
registering the plurality of subscriber identities in a radiotelephone network of the radiotelephone system;
detecting that a call is being transmitted or received using the one subscriber identity;
deregistering all of the plurality of the subscriber identities except the one subscriber identity responsive to the step of detecting.

19. A method for operating a radiotelephone in a radiotelephone system including a radiotelephone network comprising the step of:
registering, with the radiotelephone network, a plurality of subscriber identities associated with the radiotelephone;
receiving an indication of an incoming call for a first subscriber identity;
deregistering a second subscriber identity responsive to the step of receiving the indication of the incoming call; and
continuing the incoming call using the first subscriber identity responsive to the step of deregistering the second subscriber identity.

20. A method for operating a radiotelephone according to claim 19 further comprising the step of:
reregistering the second subscriber identity responsive to ending the incoming call.

21. A method for operating a radiotelephone according to claim 19 wherein the step of deregistering the second subscriber identity occurs during set up of the incoming call.

22. A method for operating a radiotelephone according to claim 19 wherein the step of deregistering the second subscriber identity occurs after the incoming call has been set up.

23. A method for operating a radiotelephone in a radiotelephone system including a radiotelephone network the method comprising the steps of:
registering with the radiotelephone network a plurality of subscriber identities, including a first subscriber identity and a second subscriber identity associated with the radiotelephone;
receiving an incoming call or placing an outgoing call using the first subscriber identity;
forwarding an incoming call for the second subscriber identity to the first subscriber identity responsive to the step of receiving or placing; and
continuing the incoming call or the outgoing call using the first subscriber identity responsive to the step of forwarding.

24. A method for operating a radiotelephone according to claim 23 wherein the step of forwarding an incoming call occurs prior to the step of receiving or placing.

25. A method for operating a radiotelephone according to claim 23 wherein the step of forwarding an incoming call occurs during the step of receiving or placing.

26. A method for operating a radiotelephone network in a radiotelephone system including at least one radiotelephone, the method comprising the steps of:
registering, with the radiotelephone network, a plurality of subscriber identities associated with the radiotelephone;
receiving a request for an incoming call for a first subscriber identity;
deregistering a second subscriber identity responsive to the step of receiving the indication of the incoming call;
continuing the incoming call using the first subscriber identity responsive to the step of deregistering the second subscriber identity;
receiving a request for an incoming call for the second subscriber identity;
determining that a second subscriber identity and the first subscriber identity are associated with the at least one radiotelephone responsive to the step of receiving a request for the incoming call for the second subscriber identity;
determining that a call is already in progress with the first subscriber identity responsive to the step of determining that the second subscriber identity and the first subscriber identity are associated with the at least one radiotelephone; and
responding to the request for the incoming call for the second subscriber identity responsive to the step of determining that a call is in progress.

27. A method for operating a radiotelephone network according to claim 26 wherein the step of responding further comprises the step of:
generating a busy signal for a call originator of the incoming call.

28. A method for operating a radiotelephone network according to claim 26 wherein the step of responding further comprises the step of:
routing the incoming call to a voice message service.

29. A method for operating a radiotelephone network according to claim 26 wherein the step of responding further comprises the step of:
forwarding the incoming call to a predetermined subscriber identity.

30. A method for operating a radiotelephone network according to claim 26 wherein the step of responding further comprises the step of:
sending a call waiting message to the first subscriber identity.

* * * * *